US011242866B2

(12) United States Patent
Jain et al.

(10) Patent No.: US 11,242,866 B2
(45) Date of Patent: Feb. 8, 2022

(54) CASING HAVING A NON-AXISYMMETRIC COMPOSITE WALL

(71) Applicant: General Electric Company, Schenectady, NY (US)

(72) Inventors: Manoj Kumar Jain, Bangalore (IN); Nagamohan Govinahalli Prabhakar, Bangalore (IN); Scott Roger Finn, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 658 days.

(21) Appl. No.: 16/051,943

(22) Filed: Aug. 1, 2018

(65) Prior Publication Data
US 2020/0040909 A1    Feb. 6, 2020

(51) Int. Cl.
| | |
|---|---|
| *F04D 29/52* | (2006.01) |
| *F01D 25/00* | (2006.01) |
| *F01D 21/04* | (2006.01) |
| *F04D 29/02* | (2006.01) |
| *B32B 27/08* | (2006.01) |
| *B32B 27/20* | (2006.01) |
| *B29C 70/30* | (2006.01) |
| *F01D 25/26* | (2006.01) |
| *B29L 31/00* | (2006.01) |

(52) U.S. Cl.
CPC ............ *F04D 29/522* (2013.01); *B29C 70/30* (2013.01); *B32B 27/08* (2013.01); *B32B 27/20* (2013.01); *F01D 21/045* (2013.01); *F01D 25/005* (2013.01); *F01D 25/26* (2013.01); *F04D 29/023* (2013.01); *B29L 2031/7162* (2013.01); *F05D 2220/36* (2013.01); *F05D 2230/40* (2013.01); *F05D 2230/50* (2013.01); *F05D 2240/14* (2013.01); *F05D 2300/6034* (2013.01)

(58) Field of Classification Search
CPC .............................. F01D 25/045; F01D 25/26
See application file for complete search history.

(56) References Cited

U.S. PATENT DOCUMENTS

| | | |
|---|---|---|
| 5,273,393 A | 12/1993 | Jones et al. |
| 5,431,532 A | 7/1995 | Humke et al. |
| 6,206,631 B1 | 3/2001 | Schilling |
| 6,324,833 B1 | 12/2001 | Singer et al. |
| 6,382,905 B1 | 5/2002 | Czachor et al. |
| 6,619,913 B2 | 9/2003 | Czachor et al. |

(Continued)

*Primary Examiner* — David Hamaoui
*Assistant Examiner* — John S Hunter, Jr.
(74) *Attorney, Agent, or Firm* — Dority & Manning, P.A.

(57) ABSTRACT

Walls of gas turbine engine casings, fan cases, and methods for forming walls, e.g., fan case walls, are provided. For example, a wall comprises a plurality of composite plies arranged in a ply layup. The wall is annular and circumferentially segmented into a plurality of regions that include at least one first region and at least one second region. The ply layup in the first and second regions is different such that the ply layup is non-axisymmetric. An exemplary fan case comprises an annular inner shell, a filler layer, an annular back sheet, and an annular outer layer. The back sheet is circumferentially segmented into a plurality of regions, including at least one first region and at least one second region, and comprises a plurality of composite plies arranged in a ply layup that is different in the first and second regions such that the ply layup is non-axisymmetric.

19 Claims, 8 Drawing Sheets

(56) References Cited

U.S. PATENT DOCUMENTS

| | | | |
|---|---|---|---|
| 7,246,990 B2 | 7/2007 | Xie et al. | |
| 8,074,694 B2 | 12/2011 | Brook et al. | |
| 8,123,463 B2 * | 2/2012 | Kray | F01D 5/282 |
| | | | 415/115 |
| 8,371,803 B2 | 2/2013 | Evans | |
| 8,746,618 B2 | 6/2014 | Brook et al. | |
| 8,757,958 B2 | 6/2014 | Lussier | |
| 8,966,754 B2 | 3/2015 | Xie | |
| 8,986,797 B2 | 3/2015 | Xie | |
| 9,249,681 B2 | 2/2016 | Robertson, Jr. et al. | |
| 9,517,613 B2 | 12/2016 | Moram et al. | |
| 10,302,042 B2 * | 5/2019 | Atassi | F02K 1/15 |
| 10,450,870 B2 * | 10/2019 | Nandula | F01D 5/147 |
| 10,519,965 B2 * | 12/2019 | Xie | F04D 29/526 |
| 2008/0199301 A1 | 8/2008 | Cardarella, Jr. | |
| 2015/0275695 A1 | 10/2015 | Evans et al. | |
| 2015/0314556 A1 | 11/2015 | Xie et al. | |
| 2016/0097299 A1 | 4/2016 | Evans | |
| 2017/0204870 A1 * | 7/2017 | Xie | F04D 29/023 |
| 2017/0356698 A1 | 12/2017 | Andersen et al. | |
| 2017/0370246 A1 | 12/2017 | Olver et al. | |
| 2018/0080339 A1 | 3/2018 | Kray et al. | |

\* cited by examiner

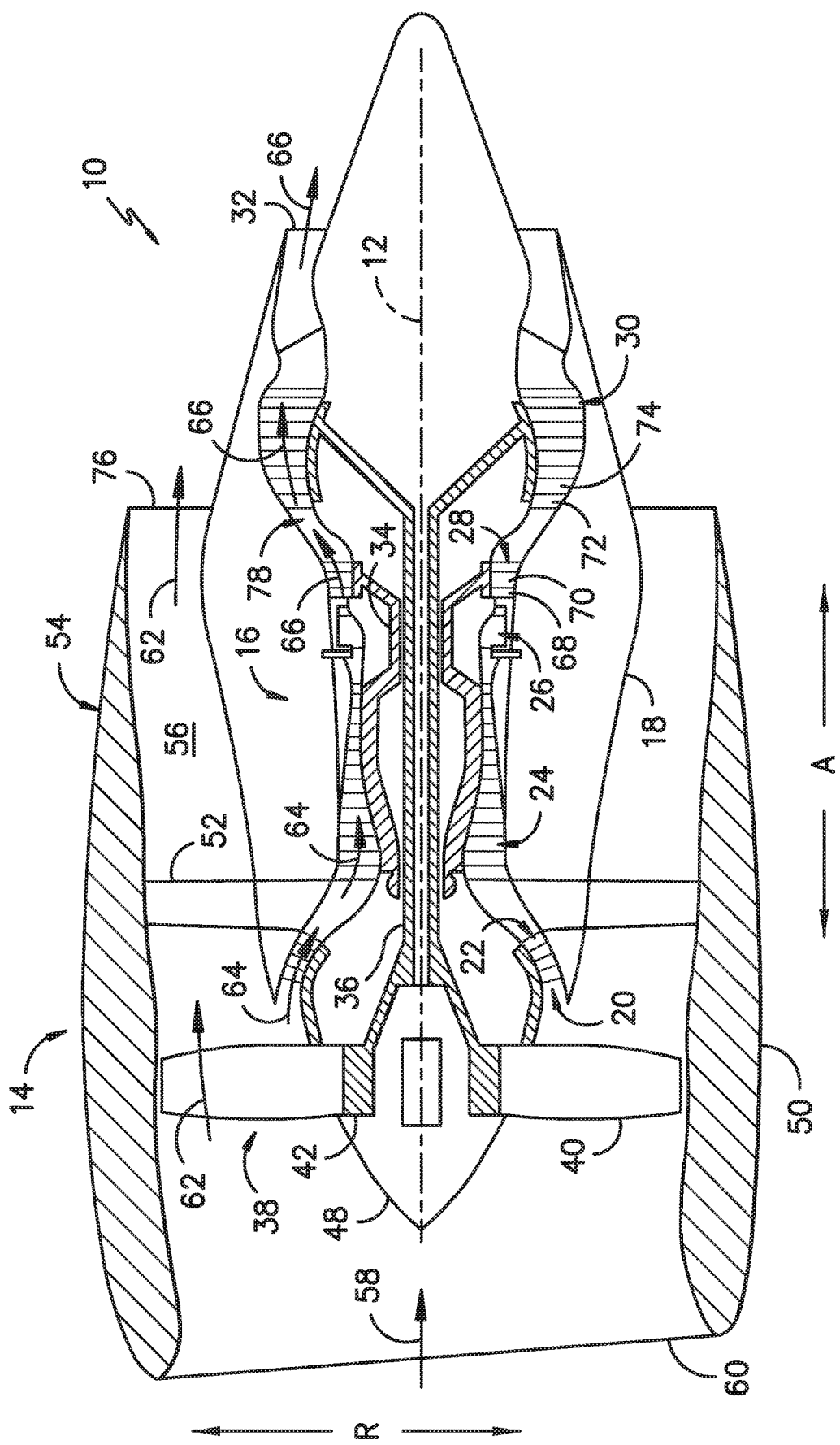
FIG. -1-

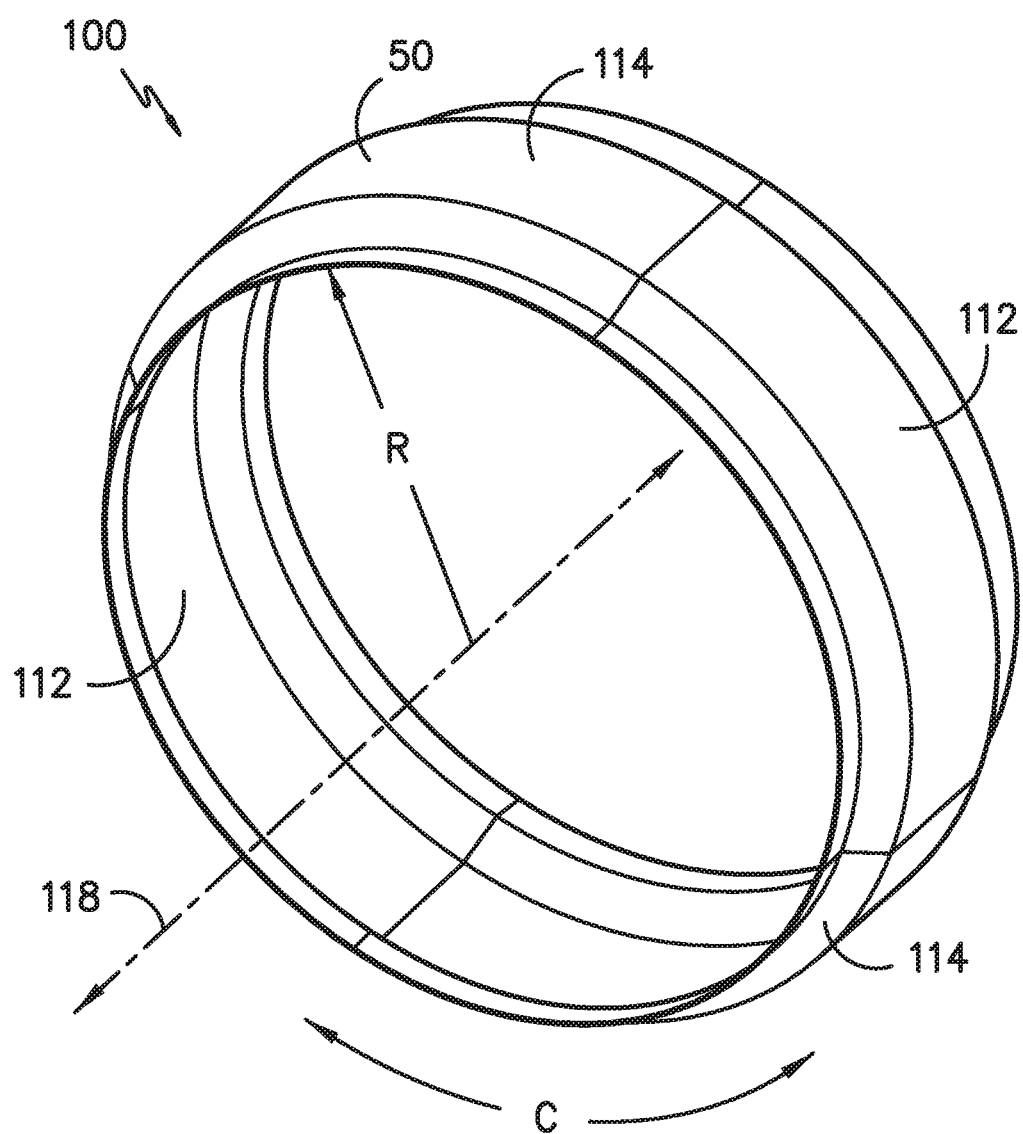
FIG. -2-

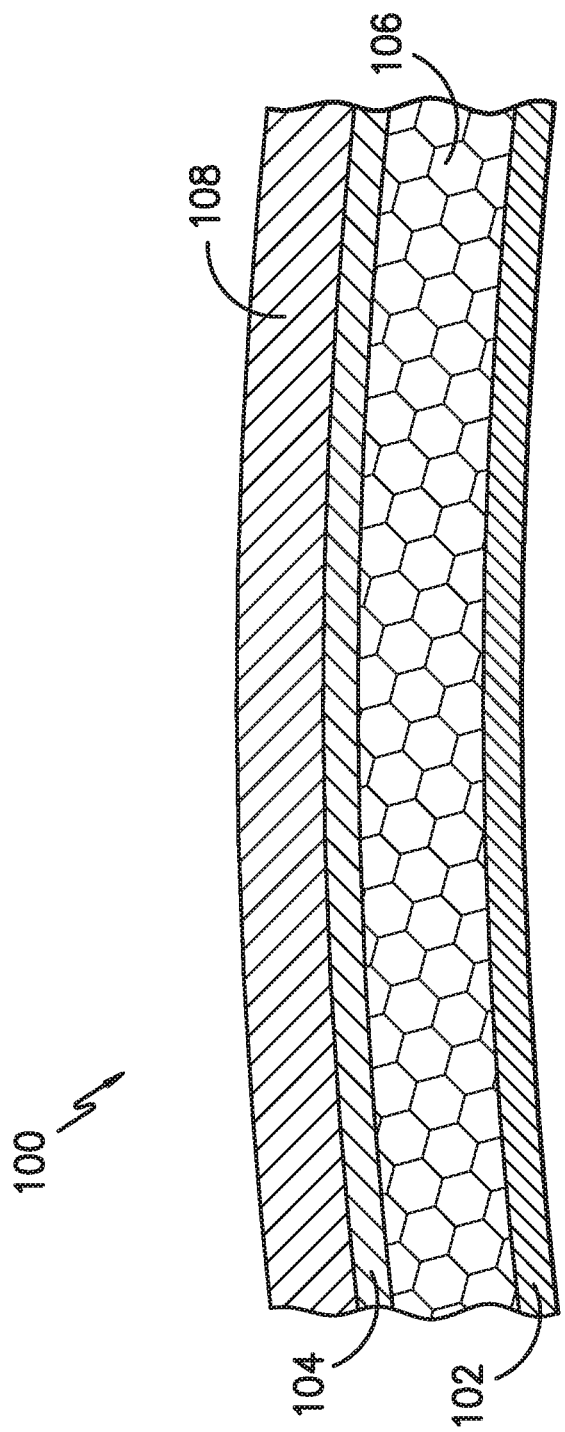
FIG. -3-

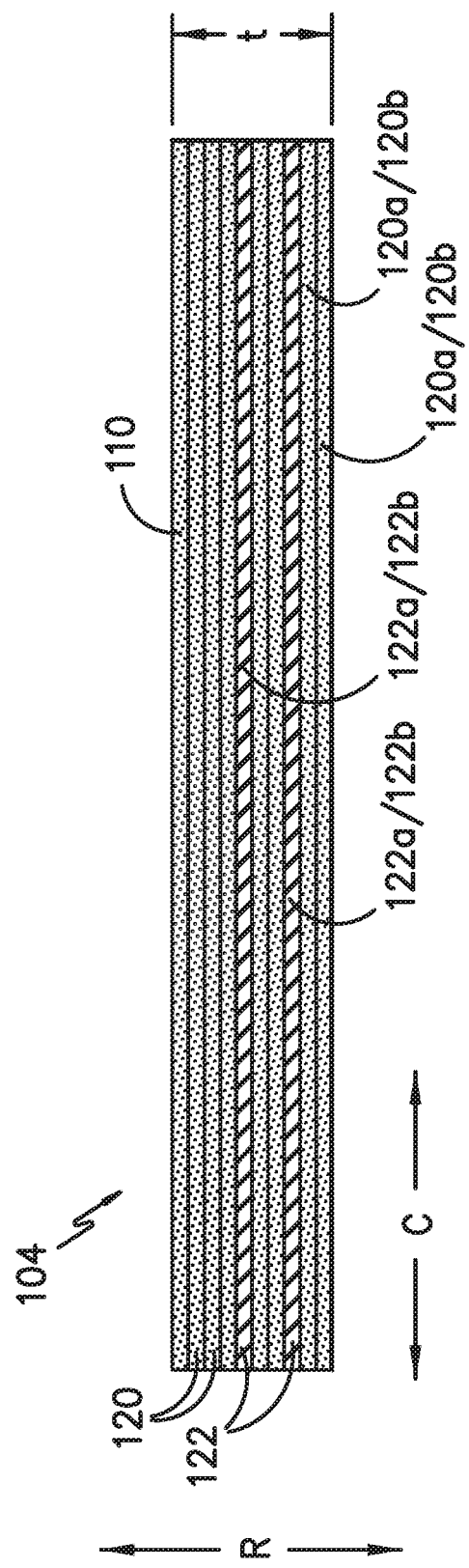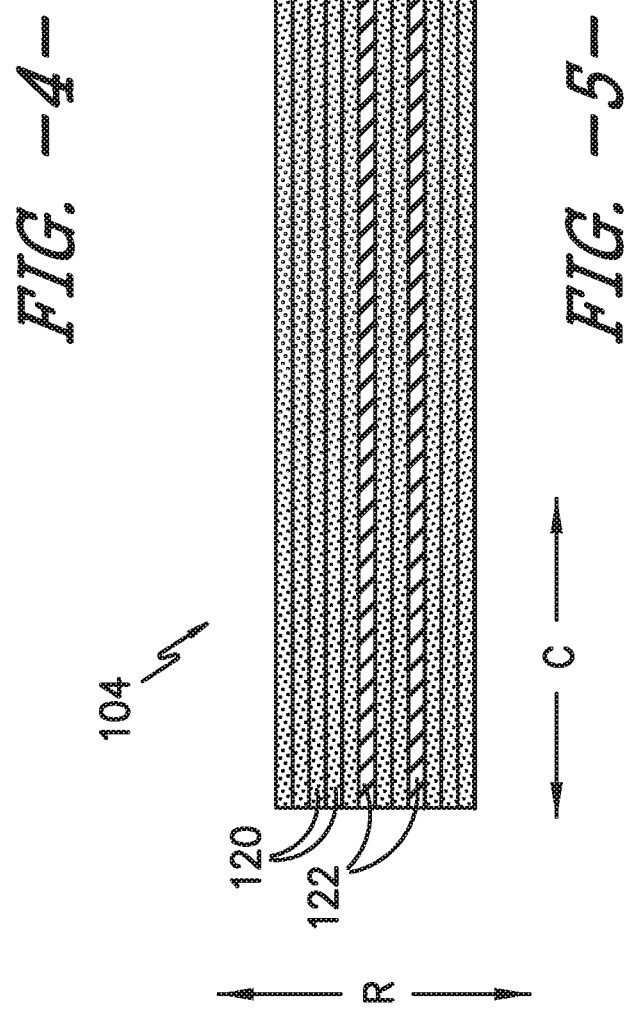
FIG. -4-
FIG. -5-

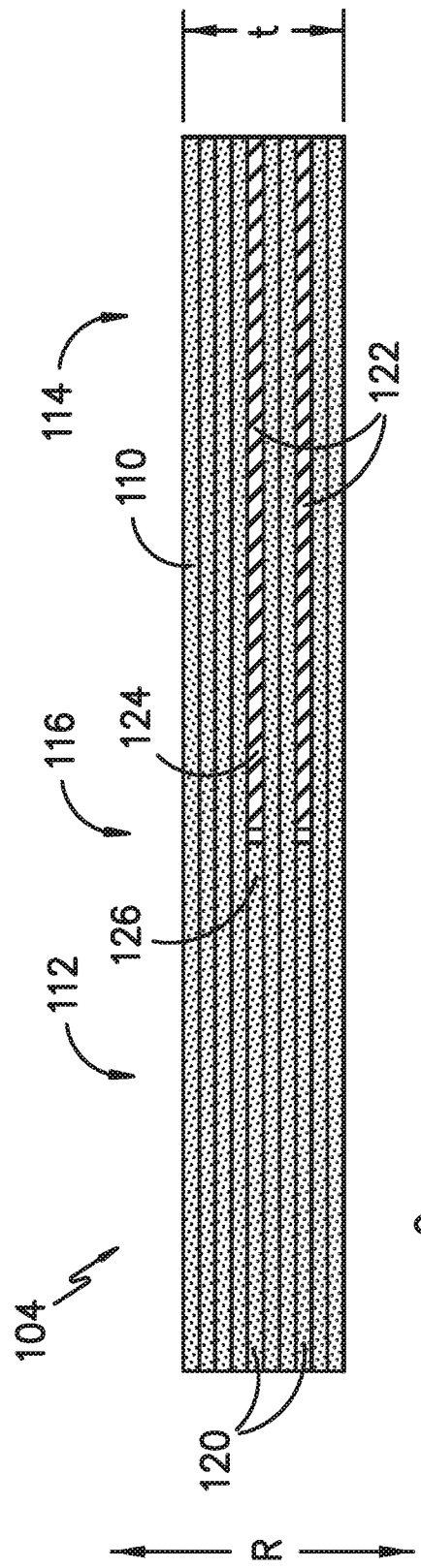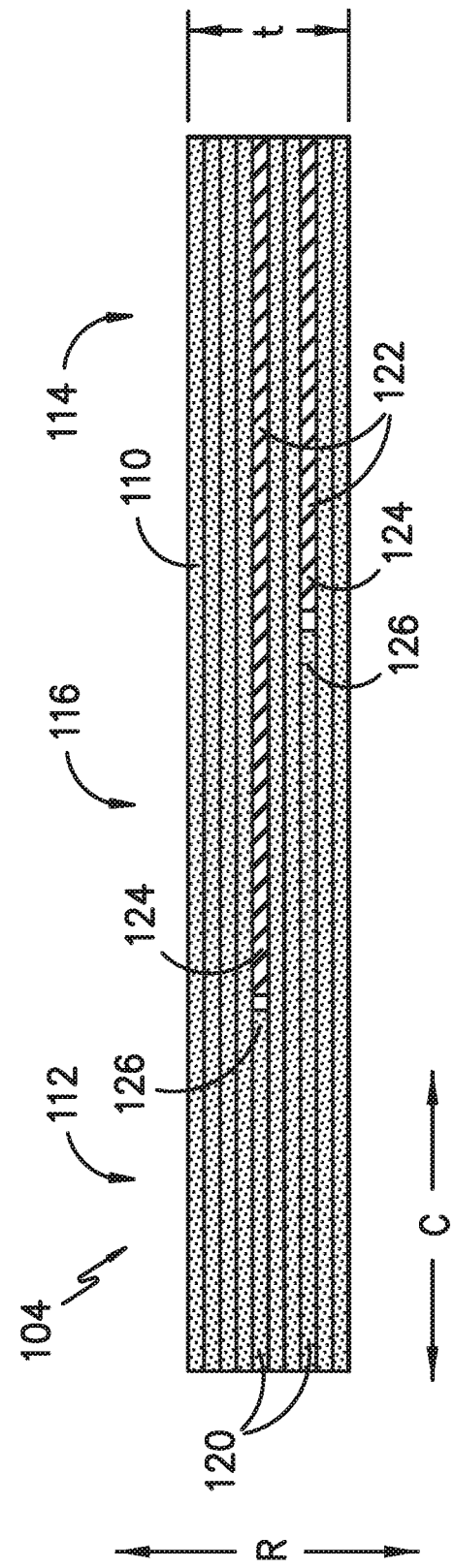

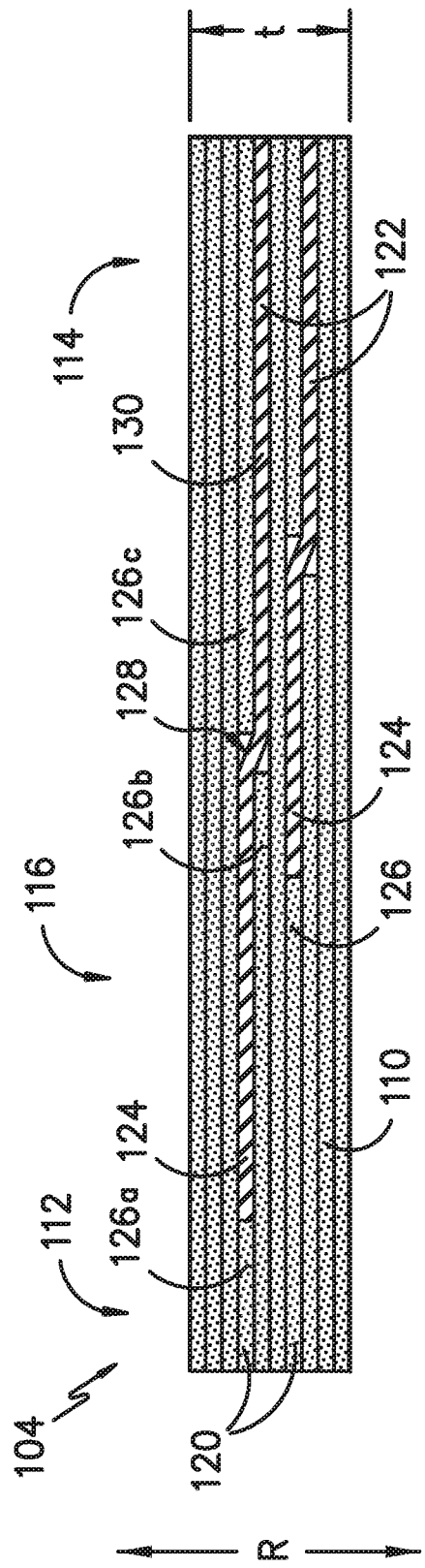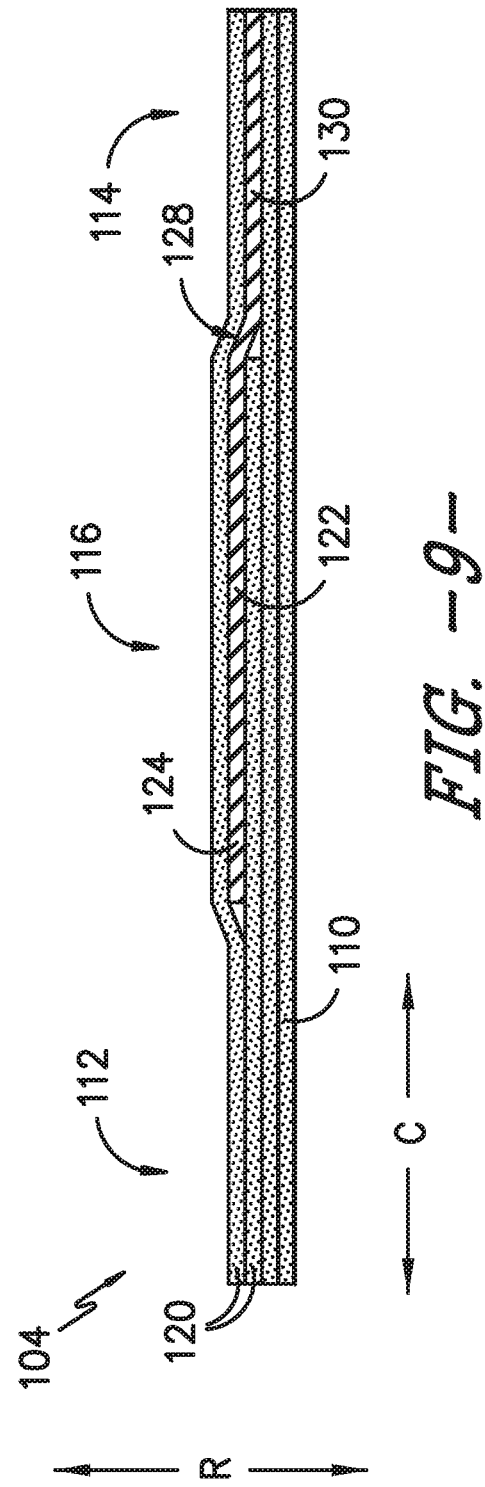

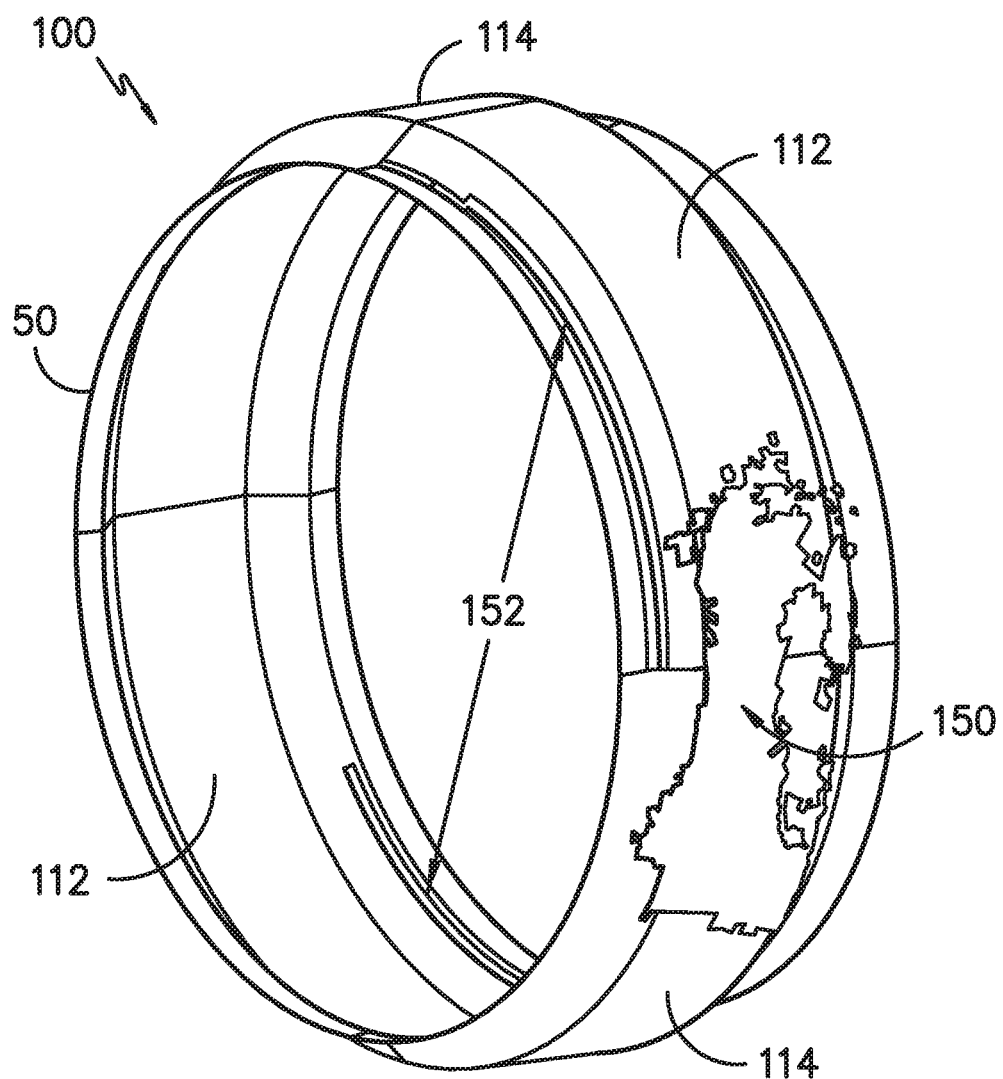
FIG. -10-

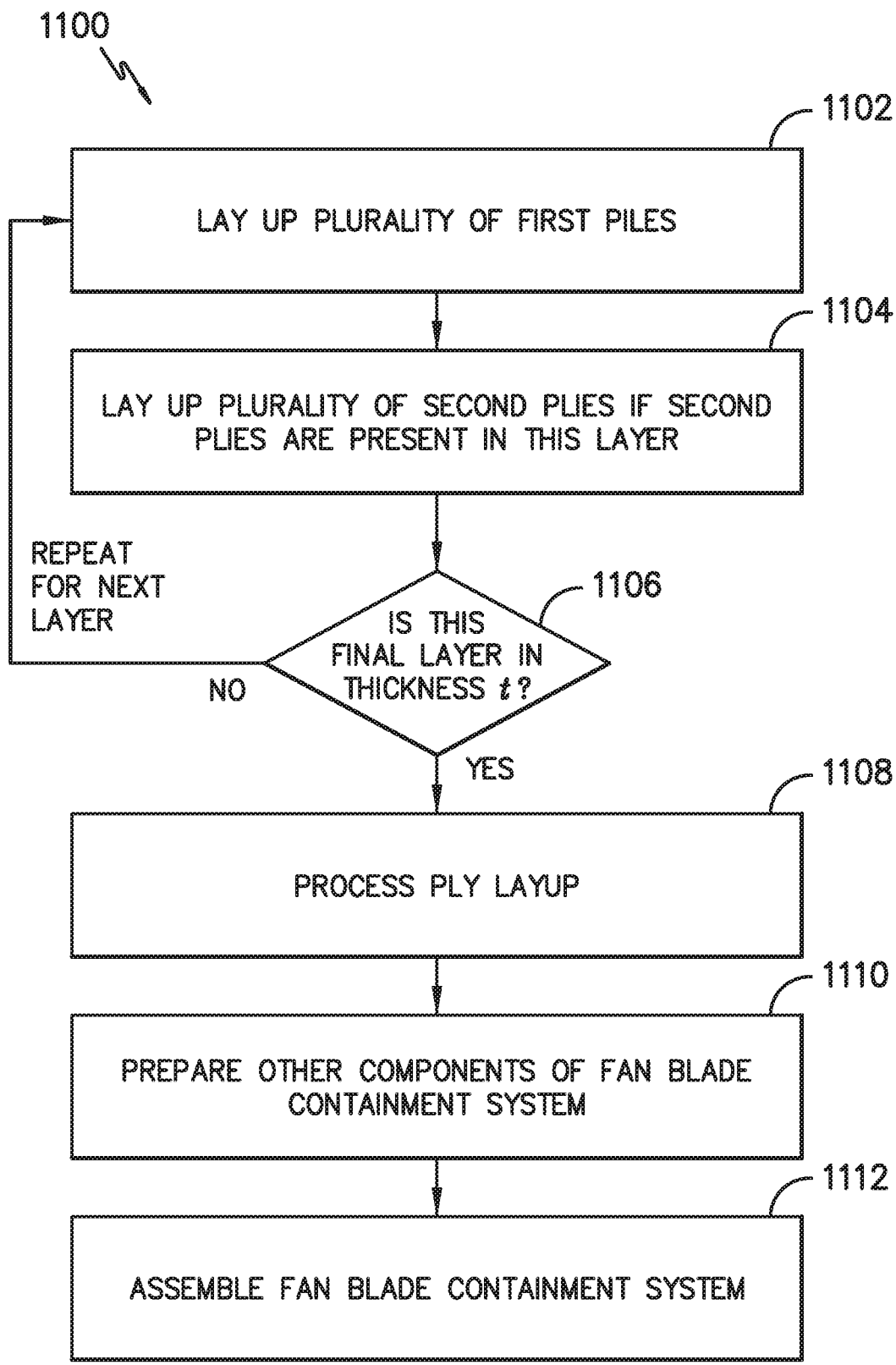
FIG. -11-

CASING HAVING A NON-AXISYMMETRIC COMPOSITE WALL

FIELD

The present subject matter relates generally to composite components. More particularly, the present subject matter relates to non-axisymmetric ply layups in annular composite components, such as fan cases of gas turbine engines.

BACKGROUND

Aircraft gas turbine engines operate in various conditions and foreign objects may be ingested into the engine. During operation of the engine and, in particular, during movement of an aircraft powered by the engine, the fan blades may be impacted and damaged by foreign objects such as, for example, birds or debris picked up on a runway. Impacts on the fan blades may damage the blades and result in blade fragments or entire blades being dislodged and flying radially outward at relatively high velocity.

To limit or minimize consequential damage, some known engines include a metallic or composite casing or shell to facilitate increasing a radial and an axial stiffness of the engine and to facilitate reducing stresses near the engine casing penetration. Composite fan casings for a gas turbine engine have been developed such as those disclosed in U.S. Pat. No. 7,246,990 to Xie, et al., which issued Jul. 24, 2007 and is assigned to the present assignee, General Electric Company.

Composite fan cases and shells are subject to damage due to strains induced during large applied loads such as fan blade-out (FBO). Such damage can propagate to an extended 360 degree crack, which can weaken the overall load carrying capability of the casing or shell, e.g., by eliminating a primary load path. A load path is needed to, e.g., transfer loads on the inlet and forward portion of the fan case to the engine mounts, which may be located aft of the fan case. Thus, it is highly desirable to provide a composite containment shell or casing to limit damage during FBO, and it is highly desirable that such damage does not propagate to an extended 360 degree crack. Typically, composite fan casings utilize an axisymmetric ply layup, where all plies forming the casing have the same orientation, to, e.g., provide hoop strength to the casing. Further, FBO events usually are random with respect to clocking position of the fan blades, so there is no location around the circumference that is more or less likely to be subjected to an impact event. As a result, designing the case for local strength during FBO would result in a typical axisymmetric design. However, such designs can exhibit poor crack growth characteristics as described.

Accordingly, improved composite walls for a casing of a gas turbine engine would be desirable. In particular, an annular wall, such as a back sheet for a gas turbine engine fan case, having a non-axisymmetric ply layup would be beneficial. Further, such composite walls or back sheets having a radially unsymmetrical ply layup would be useful. Additionally, methods for forming such composite walls or back sheets would be advantageous.

BRIEF DESCRIPTION

Aspects and advantages of the invention will be set forth in part in the following description, or may be obvious from the description, or may be learned through practice of the invention.

In one exemplary embodiment of the present subject matter, a wall of a gas turbine engine casing is provided. The wall comprises a plurality of composite plies arranged in a ply layup. The wall is annular and is circumferentially segmented into a plurality of regions. The plurality of regions includes at least one first region and at least one second region. The ply layup in the at least one first region is different from the ply layup in the at least one second region such that the ply layup is non-axisymmetric.

In another exemplary embodiment of the present subject matter, a fan case is provided. The fan case comprises an annular inner shell, a filler layer, an annular back sheet, and an annular outer layer. The back sheet is circumferentially segmented into a plurality of regions, including at least one first region and at least one second region. The back sheet comprises a plurality of composite plies arranged in a ply layup, and the ply layup in the at least one first region is different from the ply layup in the at least one second region such that the ply layup is non-axisymmetric.

In a further exemplary embodiment of the present subject matter, a method for forming a wall of a fan case is provided. The method comprises laying up a first plurality of first plies to form a first region of the annular fan case and laying up a second plurality of first plies and a plurality of second plies to form a second region of the fan case. The second region adjoins the first region. The first plurality of first plies, the second plurality of first plies, and the plurality of second plies form a ply layup. The second plies are oriented differently than the first plies such that the ply layup is non-axisymmetric.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-section view of an exemplary gas turbine engine according to various embodiments of the present subject matter.

FIG. 2 provides a perspective view of the fan blade containment system having a composite back sheet according to an exemplary embodiment of the present subject matter.

FIG. 3 provides a schematic cross-section view of the fan blade containment system of FIG. 2.

FIG. 4 provides a schematic cross-section view of a ply layup forming the back sheet of the fan blade containment system of FIG. 2 according to an exemplary embodiment of the present subject matter.

FIG. 5 provides a schematic cross-section view of a ply layup forming the back sheet of the fan blade containment system of FIG. 2 according to another exemplary embodiment of the present subject matter.

FIGS. 6, 7, 8, and 9 provide schematic cross-section views illustrating various exemplary transition configurations between a first region and a second region of the back sheet of the fan blade containment system of FIG. 2.

FIG. 10 provides a perspective view of the fan blade containment system of FIG. 2 after a fan blade-out (FBO) or other damaging event.

FIG. 11 provides a flow diagram illustrating a method for forming a wall, such as a back sheet, of a gas turbine engine casing, according to an exemplary embodiment of the present subject matter.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of the turbofan engine 10 may comprise a composite material, such as a polymer matrix composite (PMC) material or a ceramic matrix composite (CMC) material, which has high temperature capability. Composite materials generally comprise a fibrous reinforcement material embedded in matrix material, e.g., a polymer or ceramic matrix material. The reinforcement material serves as a load-bearing constituent of the composite material, while the matrix of a composite material serves to bind the fibers together and act as the medium by which an externally applied stress is transmitted and distributed to the fibers.

PMC materials are typically fabricated by impregnating a fabric or unidirectional tape with a resin (prepreg), followed by curing. Prior to impregnation, the fabric may be referred to as a "dry" fabric and typically comprises a stack of two or more fiber layers (plies). The fiber layers may be formed of a variety of materials, nonlimiting examples of which include carbon (e.g., graphite), glass (e.g., fiberglass), polymer (e.g., Kevlar®) fibers, and metal fibers. Fibrous reinforcement materials can be used in the form of relatively short chopped fibers, generally less than two inches in length, and more preferably less than one inch, or long continuous fibers, the latter of which are often used to produce a woven fabric or unidirectional tape. PMC materials can be produced by dispersing dry fibers into a mold, and then flowing matrix material around the reinforcement fibers, or by using prepreg. For example, multiple layers of prepreg may be stacked to the proper thickness and orientation for the part, and then the resin may be cured and solidified to render a fiber reinforced composite part. Resins for PMC matrix materials can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific examples of high performance thermoplastic resins that have been contemplated for use in aerospace applications include polyetheretherketone (PEEK), polyetherketoneketone (PEKK), polyetherimide (PEI), and polyphenylene sulfide (PPS). In contrast, once fully cured into a hard rigid solid, thermoset resins do not undergo significant softening when heated but, instead, thermally decompose when sufficiently heated. Notable examples of thermoset resins include epoxy, bismaleimide (BMI), and polyimide resins.

Exemplary CMC materials may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAIV-IIC®), alumina silicates (e.g., 3M's Nextel 440 and 480), and chopped whiskers and fibers (e.g., 3M's Nextel 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

Turning to FIG. 2, the fan section 14 of the engine 10 includes a fan blade containment system 100 that includes the fan case 50 and that circumscribes and surrounds the fan 38 and the fan blades 40 to retain any fan blades 40 or fan blade fragments dislodged from the engine fan 38. A "blade-out event" or a fan blade-out (FBO) event arises when a fan blade or portion thereof is accidentally released from a rotor of a high-bypass turbofan engine. When suddenly released during flight, a fan blade can impact a surrounding fan case with substantial force, and resulting loads on the fan case can cause circumferential cracking of the fan case.

Typical fan blade containment systems are of two primary types: "hardwall" systems and "softwall" systems. Hardwall systems include an annular containment case manufactured from a high strength material with an adequate shell thickness to absorb the kinetic energy of an impacting fan blade. Softwall systems employ nesting areas defined by inner and outer annular shells having honeycomb or other suitable structures disposed therein. In addition, ballistic material, such as an aromatic polyamide fiber (e.g., Kevlar®), may be wrapped around the case structure. Blade fragments are captured within the system and prevented from further contact with other fan blades. Hardwall and softwall systems also may be combined.

As described herein, the fan blade containment system 100 is a softwall system. In the depicted embodiment, the fan case 50 includes at least one composite wall, e.g., a composite back sheet. The composite material of the composite wall of the fan case 50 preferably is a lightweight and high-strength material, such a PMC or CMC material. As described in greater detail below, an exemplary composite wall or back sheet 104 of the fan case 50 has a ply layup that is varied circumferentially such that the orientation of at least one ply of the ply layup in one region is different from the orientation of the plies in an adjoining region. The circumferentially varied ply layup is designed to guide strains induced during large applied loads, such as, during FBO events, and to arrest cracks resulting from blade penetration, vibrations, etc. It is highly beneficial during an FBO event to arrest and guide crack propagation to preserve at least one load path of the fan case.

Referring to FIG. 3, the fan blade containment system 100 including fan case 50 is annular and has an annular inner shell 102. An annular back sheet 104 is spaced radially outwardly of the inner shell 102 and surrounds the fan blades 40. An annular filler layer 106, such as a honeycomb layer, is disposed between the inner shell 102 and the back sheet 104. Further, an annular outer layer 108, such as an aromatic polyamide fiber, may cover and surround the back sheet 104 surrounding the fan blades 40.

In some embodiments, the inner shell 102 is a metallic inner wall of the fan blade containment system 100, i.e., the inner shell 102 is formed from a metal or metal alloy. However, in other embodiments the inner shell 102 is a composite inner wall of the containment system 100, formed from a composite material such as a PMC, CMC, or the like. Further, as previously stated, the back sheet 104 is a composite wall of the containment system 100. The composite back sheet 104 is formed from a ply layup 110 comprising a plurality of plies of the composite material. Referring back to FIG. 2, the annular back sheet 104 is circumferentially segmented into a plurality of regions, including at least one first region 112 and at least one second region 114. The at least one first region 112 adjoins the at least one second region 114.

FIGS. 4 through 9 provide schematic cross-section views of the ply layup 110 forming the back sheet 104, according to various exemplary embodiments of the present subject matter. More specifically, FIG. 4 illustrates the ply layup 110 in a second region 114 of the back sheet 104, and FIG. 5 illustrates another embodiment of the ply layup 110 in the second region 114. FIGS. 6-9 illustrate a transition zone 116 between the ply layup 110 of a first region 112 and a second region 114 of the back sheet 104.

As shown in FIGS. 4-9, the ply layup 110 comprises a plurality of first plies 120 and a plurality of second plies 122. Each first region 112 of the back sheet 104 includes only first plies 120, while each second region 114 includes first plies 120 and second plies 122. Thus, the ply layup 110 in the first regions 112 is different from the ply layup 110 in the second regions 114 such that the ply layup 110 is non-axisymmetric. That is, the ply layup 110 is not symmetric about an axis 118 of the fan case 50. Further, it will be appreciated that, in some embodiments, the plurality of first plies 120 comprises plies having fibers oriented in a first direction, which may be referred to as first direction plies 120a, and plies having fibers oriented in a second direction, which may be referred to as second direction plies 120b. The first direction is typically orthogonal to the second direction. Similarly, the plurality of second plies 122 comprises plies having fibers oriented in a third direction, which may be referred to as third direction plies 122a, and plies having fibers oriented in a fourth direction, which may be referred to as fourth direction plies 122b. The third direction is typically orthogonal to the fourth direction, and the third and fourth directions are different from the first and second directions. However, in other embodiments, each first ply 120 of the plurality of first plies 120 may be a woven fabric ply having fibers oriented in the first direction woven together with fibers oriented in the second direction, such that each first ply 120 comprises fibers in both the first and second directions. Likewise, each second ply 122 of the plurality of second plies 122 may be a woven fabric ply having fibers oriented in the third direction woven together with fibers oriented in the fourth direction, such that each second ply 122 comprises fibers in both the third and fourth directions.

The first plies 120 may be 0/90 plies. Thus, in embodiments in which the first plies 120 are unidirectional plies, the first plies 120 have a 0° orientation and a 90° orientation with respect to a reference axis, e.g., the axial centerline 118 of the fan case 50, which is the same as the axial centerline 12 of the engine 10 when the fan case 50 is installed in the engine. For example, the first direction plies 120a may have a 0° orientation while the second direction plies 120b may have a 90° orientation. Moreover, in embodiments in which the first plies 120 are woven plies, the first plies 120 are woven from 0° and 90° fibers. Further, the second plies 122 may be +/−45 plies. As such, in embodiments in which the second plies 122 are unidirectional plies, the second plies 122 have a +45° orientation and a −45° orientation with respect to the reference axis. For instance, the third direction plies 122a may have a +45° orientation while the fourth direction plies 122b may have a −45° orientation. In embodiments in which the second plies 122 are woven plies, the second plies 122 are woven from +45° and −45° fibers. In other embodiments, the first plies 120 are +/−45 plies, and the second plies 122 are 0/90 plies.

Referring particularly to FIG. 4, which depicts a portion of the ply layup 110 in a second region 114 of the back sheet 104, the majority of the plies in the ply layup 110 are first plies 120 and the remainder of the plies are second plies 122. For example, for a ply layup 110 comprising ten (10) plies stacked along the radial direction R to form the thickness t of the back sheet 104, compared to the a first region 112 (which comprises only first plies 120), two of the first plies 120 in the second region 114 may be replaced with second plies 122. As such, 20% of the plies in the ply layup 110 in the second region 114 are second plies 122, and the remaining 80% of the plies are first plies 120.

In other embodiments, rather than replacing first plies 120 with second plies 122, the second plies 122 may be added to the ply layup 110 in the second region 114. As illustrated in FIG. 5, for a ply layup 110 comprising a total of ten (10) plies in a first region 112, the ply layup 110 comprises more than ten plies in the second region 114. In the depicted embodiment, the ply layup 110 comprises ten first plies 120 and two second plies 122 for a total of twelve (12) plies in the second region 114. As such, for the ply layup 110 of the second region 114 shown in FIG. 5, approximately 17% of the plies are second plies 122, and the remaining approximately 83% of the plies are first plies 120.

As examples of the ply layup 110 comprising unidirectional plies 120, 122, in the first region 112, which is formed only from first plies 120, the first direction plies 120a may be laid up with the second direction plies 120b such that the ply layup 110 alternates between first direction plies 120a and second direction plies 120b along a thickness t of the back sheet 104. In the second region 114, which is formed from first plies 120 as well as second plies 122, the first and second direction plies 120a, 120b may be still be alternated along the thickness t, but at least one layer of third direction plies 122a and at least one layer of fourth direction plies 122b either replace at least one layer of first direction plies 120a and/or at least one layer of second direction plies 120b or are added to the layers of first and second direction plies 120a, 120b. As illustrated in FIG. 4, in various embodiments, which of the first and second direction plies 120a, 120b is the radially inmost ply of the first plies 120 in the ply layup 110 and which of the third and fourth direction plies 122a, 122b is the radially inmost ply of the second plies 122 in the ply layup 110 may vary. For example, in one embodiment, the layup 110 may start with a first direction ply 120a as the radially inmost ply, a second direction ply 120b may be stacked on the first first direction ply 120a, a third direction ply 122a may be stacked on the first second direction ply 120b, a first direction ply 120a followed by a second direction ply 120b may be stacked on the third direction ply 122a, a fourth direction ply 122b may be stacked on the second second direction ply 120b, then a first direction ply 120a, a second direction ply 120b, a first direction ply 120a, and a second direction ply 120b may be stacked on the fourth direction ply 122b to complete the ply layup 110. In another embodiment, the ply layup 110 may start with a second direction ply 120b as the radially inmost ply and a fourth direction ply 122b may be the radially inmost ply of the second plies 122 in the ply layup 110. Other orders of the first and second plies 120, 122 in the second region 114 may be used as well.

As examples of the ply layup 110 comprising woven plies 120, 122, the first region 112 is formed from the first plies 120, i.e., a plurality of first plies 120 are laid up to define the thickness t of the back sheet 104. In the second region 114, the first plies 120 are laid up like they are laid up in the first region 112, but at least two layers of second plies 122 either replace or are added to the layers of first plies 120. For example, as illustrated in FIG. 4, the third and sixth plies in the ply layup 110 in the second region 114, counting from the radially innermost ply in the layup 110, are second plies 122, and the ply layup 110 comprises a total of ten (10) plies. In the first region 112, the third and sixth plies (as well as the remaining plies in the layup 110 in the first region 112) are first plies 120 for a total of ten plies in the ply layup 110 in the first region 112. Therefore, the second plies 122 replace first plies 120 in the second region 114, such that the back sheet 104 has a uniform thickness t (i.e., the same thickness tin both the first and second regions 112, 114). As another example, as illustrated in FIG. 5, the third and sixth plies in the ply layup 110 in the second region 114, counting from the radially innermost ply in the layup 110, are second plies 122, but the ply layup 110 comprises a total of twelve (12) plies. In the first region 112, the third and sixth plies (as well as the remaining plies in the layup 110 in the first region 112) are first plies 120 for a total of ten plies in the ply layup 110 in the first region 112. Thus, in the embodiment of FIG. 5, the second plies 122 are added to the layup of first plies 120 and the back sheet 104 has an increased thickness t in the second region 114 (i.e., a locally increased thickness in the second region(s) 114).

As shown in the exemplary embodiments of FIGS. 4 and 5, whether the plies 120, 122 are unidirectional or woven, the second plies 122 are interleaved with the first plies 120 such that the wall or back sheet 104 is unsymmetrical along its thickness t. That is, the ply layup 110 in the second region 114 is unsymmetrical along the radial direction R or is unsymmetrical about a midline that extends about the circumference of the back sheet 104 at the radial center of the ply layup 100. In the particular embodiments shown in FIGS. 4 and 5, the second plies 122 are located radially inward compared to the stack of plies overall, i.e., more first plies 120 than second plies 122 are located radially outward in the ply layup 110. As such, the ply layup 110 is not symmetric about the thickness t of the back sheet 104.

Referring back to FIG. 2, in an exemplary embodiment of the present subject matter, the back sheet 104 includes two first regions 112 and two second regions 114 for a total of four regions. However, in other embodiments, the back sheet 104 may include a different number of first regions 112 and second regions 114, e.g., the back sheet 104 may include three first regions 112 and three second regions 114 for a total of six regions. Each region 112, 114 may be substantially equal in size or may be unequal in size. For instance, each region 112, 114 comprises an angular portion of the annular back sheet 104. In some embodiments, each of the first and second regions 112, 114 comprises a substantially equal angular portion of the back sheet 104, e.g., for a four region back sheet 104, each region 112, 114 extends 90° of the total 360° of the back sheet 104, and for a six region back sheet 104, each region 112, 114 extends 60° of the 360° total. In other embodiments, each first region 112 comprises a different angular portion of the back sheet 104 than each second region 114 such that each first region 112 is unequal in size to each second region 114. As an example, for a back sheet 104 having two first regions 112 and two second regions 114, each first region 112 may extend 120° of the total 360° of the back sheet 104 and each second region 114 may extend 60° of the 360° total or vice versa (each first region 112 extends 60° and each second region extends 120°).

Turning now to FIGS. 6-9, different ways of transitioning between a first region 112 and a second region 114 will be described. FIG. 6 illustrates a non-staggered butt splice transition configuration. In the non-staggered butt splice configuration, an end 124 of each second ply 122 is aligned along the radial direction R or thickness t of the ply layup 110. An end 126 of each first ply 120 that is positioned in the first region 112 at the same radial location as the second plies 122 in the second region 114 is located at or near the end 124 of a second ply 122. Thus, the second plies 122 of the second region 114 butt up against or near the first plies 120 of the first region 112. As shown in FIG. 6, the non-staggered butt splice configuration introduces the second plies 120 into the ply layup 110 without increasing the thickness t of the ply layup 110, i.e., the ply layup 110 has a constant or uniform thickness in both the first and second regions 112, 114.

FIG. 7 illustrates a staggered butt splice transition configuration. In the staggered butt splice configuration, the ends 124 of the second plies 122 in the second region 114 are not aligned. That is, the end 124 of one second ply 122 is offset from the end 124 of another second ply 122 along the circumferential direction C. As such, a transition zone 116 is defined between the first region 112 and second region 114, where the plies at particular radial locations transition from first plies 120 in the first region 112 to second plies 122 in the second region 114. Like the non-staggered butt splice configuration, the end 126 of each first ply 120 that is positioned in the first region 112 at the same radial location as the second plies 122 in the second region 114 is located at or near the end 124 of a second ply 122. Thus, the second plies 122 of the second region 114 butt up against or near the first plies 120 of the first region 112, but where the ends 124, 126 meet is staggered along the radial direction R or thickness t of the ply layup 110. Further, as shown in FIG. 7, the staggered butt splice configuration introduces the second plies 120 into the ply layup 110 without increasing the thickness t of the ply layup 110, i.e., the ply layup 110 has a constant or uniform thickness in both the first and second regions 112, 114.

FIG. 8 illustrates an overlap splice transition configuration having a constant or uniform thickness, and FIG. 9 illustrates an overlap splice transition configuration with a local increased thickness. In the overlap splice configurations, the end 124 of a second ply 122 overlaps the end 126 of a first ply 120 that is positioned at the same radial location in the first region 112 as the second ply 122 is positioned in the second region 114. As such, the ends 124 of the second plies 122 are at different radial locations than the remainder of the respective ply 122. The overlap splices are formed in the transition zone 116 between the first region 112 and the second region 114.

In the embodiment of FIG. 8, in which the second plies 120 are introduced into the ply layup 110 without increasing the thickness t of the ply layup 110, i.e., the ply layup 110 has a constant or uniform thickness in both the first and second regions 112, 114, an end 126a of a first ply 120 is positioned at the end 124 of the second ply 122 that is at the same radial location as the first ply 120. Further, an end 126b of a first ply 120 is positioned under (or radially inward of) the end 124 of the second ply 122 and against a transition area 128 of the second ply 122 from the overlapping end 124 to a body 130 of the ply 122. Moreover, an end 126c of another first ply 120 is positioned against the transition area 128 above (or radially outward of) the body 130 of the ply 122. Additionally, the ends 124 of the second plies 122 in the second region 114 are staggered with respect to one another. In this way, the first plies 120 compensate for the step in the second ply 122 at the transition zone 116.

In the embodiment of FIG. 9, a first ply 120 is positioned over the end 124 of the second ply 122 such that the first ply 120 overlaps the overlapping end 124 of the second ply 122. As such, the thickness t of the ply layup 110 is locally increased in the transition zone 116, where the end 124 of the second ply 122 overlaps a first ply 120 and another first ply 120 overlies or overlaps the second ply 122. FIG. 9 illustrates only a portion of the thickness t of the ply layup 110, but it will be understood that the overlap splice transition configuration shown with respect to one second ply 122 would be replicated with respect to any other second plies 122 within the second region 114 and, thus, create a locally increased thickness of the ply layup 110 in the transition zone 116 between the first region 112 and the second region 114.

In some embodiments, a different transition configuration may be used for different second plies 122. For example, a butt splice may be used to transition from a first ply 120 to a second ply 122 at one radial location, and an overlap splice may be used to transition from a first ply 120 to a second ply 122 at another radial location. Further, it will be appreciated that each first ply 120 has two ends 126, one end 126 opposite the other end 126, and each second ply 122 has two ends 124, one end 124 opposite the other end 124. In some embodiments, the same transition configuration may be used at both ends 124 of a given second ply 122. In other embodiments, a different transition configuration may be used at each end 124 of a given second ply 122.

FIG. 10 provides a perspective view of a fan blade containment system 100 as described herein after a fan blade-out (FBO) or other damaging event. As shown in FIG. 10, a fan blade, portion of a fan blade, or other debris has created a damaged area 150 in the fan case 50 of the fan blade containment system 100. Further, a crack 152 has formed in each first region 112 of the back sheet 104, either from the initial debris impact or from subsequent vibrations of the fan case 50. Cracks in unidirectional or woven plies typically form parallel to one of the fiber directions; thus, without varying the fiber direction, cracks can propagate 360° or about the entire circumference of the fan case. However, as shown in FIG. 10 illustrating the subject matter described herein, the propagation of each crack 152 is arrested at the second regions 114 of the back sheet 104. That is, the crack 152 does not extend into the second regions 114 and, as a result, does not extend about the entire circumference, or all 360°, of the annular back sheet 104. Rather, varying the ply layup 110 of the composite back sheet 104 locally strengthens the back sheet 104, i.e., the different ply layup 110 of the second regions 114 compared to the first regions 112 as described herein locally strengthens the second regions 112. The locally strengthened second regions 112 help arrest and guide crack propagation, thereby preserving at least one load path of the fan case 50 even upon damage during an FBO or other damaging event. More particularly, adding or including plies having alternate fiber directions helps to bridge the cracks and cause either crack arrest or crack turning, such that 360° cracks are unlikely to form.

Turning now to FIG. 11, a flow diagram is provided illustrating an exemplary method 1100 for forming a wall, such as a back sheet 104, of a fan case 50 and fan blade containment system 100. As shown at 1102-1106 in FIG. 11, the method 1100 comprises laying up a first plurality of first plies 120 and a second plurality of plies 122 layer by layer through a thickness t to form the annular fan case 50 having a first region 112 and a second region 114. As described above and shown in FIGS. 2 and 10, the second region 114 adjoins the first region 112, and as shown in FIGS. 4-9, the first plurality of plies 120 and the second plurality of plies 122 form a ply layup 110. More specifically, as shown at 1102 and 1104, the method 1100 includes laying up a plurality of first plies 120 to form a layer of the ply layup 110 in each of the first and second regions 112, 114. The method 1100 also includes laying up a plurality of second plies 122 to form a portion of the layer in the second region 114 if second plies 122 should be part of that layer. As illustrated in FIGS. 4-9, the second region 114 comprises some layers formed from the first plies 120 and some layers formed from the second plies 122, such that a given layer of the ply layup 110 may or may not comprise second plies 122 in the second region 114. As shown at 1106 in FIG. 11, the method 1100 includes continuing to form layers of either first plies 120 or a combination of first and second plies 120, 122, i.e., repeating the steps shown at 1102, 1104, and 1106, until the final layer in the thickness t of the ply layup 110 is formed. Further, it will be appreciated that the ply layup 110 may be formed by laying up the plies 120, 122 on a tool, mandrel, or other support from the inside out; that is, typically the radially innermost layer of plies in the ply layup 110 is against the tooling or support surface and the remaining layers of plies are laid up on top of the radially innermost layer.

As described herein, the second plies 122 have fibers that are oriented differently than the first plies 120 such that the ply layup 110 is non-axisymmetric. In some embodiments, the first and second plies 120, 122 are unidirectional, and the plurality of first plies 120 includes first direction plies 120a that have fibers oriented in a first direction and second direction plies 120b having fibers oriented in a second direction, where the first direction is typically orthogonal to the second direction. Similarly, the plurality of second plies 122 includes third direction plies 122a that have fibers oriented in a third direction and fourth direction plies 122b having fibers oriented in a fourth direction, where the third direction is typically orthogonal to the fourth direction and the third and fourth directions are different from the first and second directions. In other embodiments, the first and second plies 120, 122 may be formed from woven fabrics, such that the plurality of first plies 120 includes plies 120 having fibers oriented in a first direction and fibers oriented in a second direction and the plurality of second plies 122 includes plies 122 having fibers oriented in a third direction and fibers oriented in a fourth direction. The first direction may be orthogonal to the second direction and the third direction may be orthogonal to the fourth direction, but the third and fourth directions are different from the first and second directions.

In addition, as discussed with respect to FIGS. 4 and 5, the ply layup 110 has a thickness t, and the ply layup 110 in the second region 114 is unsymmetrical along the thickness t.

For example, as illustrated in FIGS. 4-8, the second plies 122 are positioned radially inward with respect to the stack of plies 120, 122 in the ply layup 110. As such, more first plies 120 are positioned radially outward than radially inward, and the distribution of first plies 120 and second plies 122 along the thickness t is uneven. Thus, the ply layup 110 in the second region 114 is unsymmetrical along the thickness t or is unsymmetrical about a midline that extends about the circumference of the back sheet 104 at the radial center of the ply layup 110.

Further, as previously described, the first and second plies 120, 122 forming the first and second regions 112, 114 are laid up such that the ply layup 110 transitions from a first ply 120 to a second ply 122 at a radial location in the second region 114. That is, at a given radial location in the second region 114, a second ply 122 is positioned in the ply layup 110 rather than a first ply 120; a first ply 120 is positioned in the ply layup 110 at the same radial location in the first region 112. The transition from the first ply 120 to the second ply 122 occurs in a transition zone 116 between the first region 112 and second region 114, and the transition may be one of several transition configurations, examples of which are illustrated in FIGS. 6-9. For instance, the transition may be a non-staggered butt splice as shown in FIG. 6, a staggered butt splice as shown in FIG. 7, an overlap splice with a constant or uniform thickness as shown in FIG. 8, or an overlap splice with a locally increased thickness as shown in FIG. 9.

Next, as shown at 1108 in FIG. 11, the ply layup 110 undergoes thermal and/or chemical processing to form the wall or back sheet 104. For example, for a PMC wall or back sheet 104, the composite ply layup 110 is debulked and consolidated, e.g., at elevated temperatures and pressures in an autoclave, and undergoes densification and final curing. For a CMC wall or back sheet 104, the composite ply layup 110 is debulked and, if appropriate, cured while subjected to elevated pressures and temperatures to produce a cured preform, e.g., the layup or preform may be cured in an autoclave to form an autoclaved body. In exemplary embodiments, the autoclaved body is then heated (fired) in a vacuum or inert atmosphere to decompose the binders, remove the solvents, and convert the precursor to the desired ceramic matrix material. Due to decomposition of the binders, the result for the preform is a porous CMC fired body that may undergo densification, e.g., melt infiltration (MI), to fill the porosity and yield the respective CMC component. Specific processing techniques and parameters for the thermal and/or chemical processing of the ply layup 110 will depend on the particular composition of the materials. As an example, other known methods or techniques for curing composite plies, as well as for densifying a CMC component, may be utilized.

After or while the wall or back sheet 104 is being formed as described with respect to 1102 through 1108 of method 1100, the additional components of the fan blade containment system 100 may be formed or prepared as shown at 1110. For instance, an inner shell 102 may be formed from a metallic or composite material, a filler layer 106 (such as honeycomb) may be prepared, and an outer layer 108 may be formed or prepared, e.g., from an aromatic polyamide fiber (such as Kevlar®) or another suitable material. As shown at 1112 in FIG. 11, the components of the fan blade containment system 100, including the back sheet 104, may be assembled to form the containment system 100.

Accordingly, as described herein, a wall of a gas turbine casing, such as a back sheet of a fan case that is part of a fan blade containment system, may be formed that preserves at least a secondary load path of the casing following a damaging event. More particularly, the wall is formed from a plurality of composite plies that are laid up in a ply layup such that the wall is non-axisymmetric. For example, the wall is circumferentially segmented into at least two regions and the ply layup in one region is different from the ply layup in another region. Further, the ply layup in one region may be unsymmetrical with respect to a thickness of the ply layup. The ply layup may be varied between regions to provide local strengthening within certain regions of the wall, which helps arrest and guide crack propagation. As a result, at least a secondary load path of the casing may be preserved to transfer loads on the inlet of the fan case to the engine mounts, as well as to help contain debris, such as a fan blade, following a damaging event such as a fan blade-out. Unlike other means for locally strengthening a casing, such as adding flanges or other structural features, varying the ply layup of the composite may be achieved by utilizing plies having a different ply orientation in at least one region of the wall, which provides local strengthening without increasing (or without appreciably increasing) the weight of the wall or casing. Other advantages of the subject matter described herein also may be realized by those of ordinary skill in the art.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A wall of a gas turbine engine casing, comprising:
   a plurality of composite plies arranged in a ply layup,
   wherein the wall is annular and is circumferentially segmented into a plurality of regions, the plurality of regions including at least a first region and a second region,
   wherein the ply layup has a thickness along a radial direction,
   wherein the ply layup in the first region extends along the radial direction over the thickness and is formed from only a first plurality of plies, the first plurality of plies comprising first fibers oriented in a first direction and second fibers oriented in a second direction,
   wherein the ply layup in the second region is formed from the first plurality of plies and a second plurality of plies, the second plurality of plies comprising third fibers oriented in a third direction and fourth fibers oriented in a fourth direction, each of the third direction and the fourth direction being different from each of the first direction and the second direction, and
   wherein the ply layup in the first region is different from the ply layup in the second region such that the ply layup is non-axisymmetric.

2. The wall of claim 1, wherein the first direction is orthogonal to the second direction.

3. The wall of claim 1, wherein the third direction is orthogonal to the fourth direction.

4. The wall of claim 1,
   wherein the ply layup in the second region is radially unsymmetrical about a radial center of the thickness.

5. The wall of claim 1, wherein the plurality of regions includes two first regions and two second regions, where the two first regions includes the first region and the two second regions includes the second region.

6. The wall of claim 5, wherein each of the two first regions and the two second regions comprise an equal angular portion of the wall.

7. The wall of claim 1, wherein the wall is a fan casing back sheet.

8. The wall of claim 1, wherein the ply layup in the first region is formed from a first plurality of plies,
   wherein the first plurality of plies comprises first fibers oriented in a 0° orientation with respect to a reference axis and second fibers oriented in a 90° orientation with respect to the reference axis.

9. The wall of claim 8, wherein the ply layup in the second region is formed from the first plurality of plies and a second plurality of plies,
   wherein the second plurality of plies comprises third fibers oriented in a +45° orientation with respect to the reference axis and fourth fibers oriented in a −45° orientation with respect to the reference axis.

10. The wall of claim 9, wherein the second plurality of plies are laid up between layers of the first plurality of plies.

11. The wall of claim 1, wherein the plurality of regions includes two first regions and two second regions, where the two first regions includes the first region and the two second regions includes the second region, and wherein each first region comprises a different angular portion of the wall than each second region such that each first region is unequal in size to each second region.

12. The wall of claim 1, wherein the ply layup in the first region is formed from a first plurality of plies,
   wherein the ply layup in the second region is formed from the first plurality of plies and a second plurality of plies, and
   wherein non-staggered butt splices are formed between the first plurality of plies and the second plurality of plies in a transition zone between the first region and the second region.

13. The wall of claim 1, wherein staggered butt splices are formed between the first plurality of plies and the second plurality of plies in a transition zone between the first region and the second region.

14. The wall of claim 1, wherein overlap splices are formed between the first plurality of plies and the second plurality of plies in a transition zone between the first region and the second region.

15. The wall of claim 1, wherein the first region has a first thickness along a radial direction and the second region has a second thickness along the radial direction, and
   wherein the second thickness is equal to or greater than the first thickness.

16. A fan case, comprising:
   an annular inner shell;
   a filler layer;
   an annular back sheet; and
   an annular outer layer,
   wherein the annular back sheet is the wall of claim 1.

17. A method for forming a wall of a fan case, the method comprising:
   laying up a first plurality of first plies to form a first region of the fan case; and
   laying up a second plurality of first plies and a plurality of second plies to form a second region of the fan case, the second region adjoining the first region,
   wherein the first plurality of first plies, the second plurality of first plies, and the plurality of second plies form a ply layup, the ply layup having a thickness along a radial direction,
   wherein the ply layup in the first region extends along the radial direction over the thickness and is formed from only a first plurality of plies, the first plurality of plies comprising first fibers oriented in a first direction and second fibers oriented in a second direction,
   wherein the ply layup in the second region is formed from the first plurality of plies and a second plurality of plies, the second plurality of plies comprising third fibers oriented in a third direction and fourth fibers oriented in a fourth direction, each of the third direction and the fourth direction being different from each of the first direction and the second direction, and
   wherein the second plies are oriented differently than the first plies such that the ply layup is non-axisymmetric.

18. The method of claim 17, wherein the ply layup in the second region is radially unsymmetrical along the thickness.

19. The method of claim 17, wherein overlap splices are formed between the first plurality of first plies and the plurality of second plies in a transition zone between the first region and the second region.

* * * * *